United States Patent
Cieler et al.

(10) Patent No.: US 7,489,238 B2
(45) Date of Patent: Feb. 10, 2009

(54) ARRANGEMENT FOR CONTROLLING ELECTRONIC DEVICES, IN PARTICULAR IN A VEHICLE

(75) Inventors: Stephan Cieler, Frankfurt (DE); Vera Donk, Babenhausen (DE); Guido Meier-Arendt, Langen (DE); Thomas Sulzbach, Offenbach (DE)

(73) Assignee: Siemens Aktiengesellschaft, Munich (DE)

( * ) Notice: Subject to any disclaimer, the term of this patent is extended or adjusted under 35 U.S.C. 154(b) by 306 days.

(21) Appl. No.: 11/412,102

(22) Filed: Apr. 27, 2006

(65) Prior Publication Data

US 2006/0261965 A1 Nov. 23, 2006

(30) Foreign Application Priority Data

Apr. 28, 2005 (DE) ........................ 10 2005 019 871

(51) Int. Cl.
*G08B 25/00* (2006.01)
(52) U.S. Cl. ........................ 340/525; 340/438; 345/173; 348/115; 715/700
(58) Field of Classification Search ................. 340/525, 340/438; 345/173; 348/115; 715/726
See application file for complete search history.

(56) References Cited

U.S. PATENT DOCUMENTS

| | | | |
|---|---|---|---|
| 5,916,288 A * | 6/1999 | Hartman | 340/461 |
| 6,781,610 B2 * | 8/2004 | Os et al. | 340/990 |
| 6,816,079 B1 * | 11/2004 | Kuenzner et al. | 340/815.4 |
| 7,170,400 B2 * | 1/2007 | Cowelchuk et al. | 340/438 |
| 2004/0117084 A1 * | 6/2004 | Mercier et al. | 701/36 |

FOREIGN PATENT DOCUMENTS

| | | |
|---|---|---|
| DE | 101 58 033 A1 | 6/2003 |
| EP | 0 940 295 B1 | 9/1999 |
| EP | 1 085 402 A2 | 3/2001 |

* cited by examiner

*Primary Examiner*—George A Bugg
*Assistant Examiner*—Samuel J Walk
(74) *Attorney, Agent, or Firm*—Laurence A. Greenberg; Werner H. Stemer; Ralph E. Locher

(57) ABSTRACT

An arrangement has a computing unit which is connected to a memory unit, an operator control device and a display device. The computing unit displays, on the display device, a first operator control display which is read out from the memory unit and is composed of at least two display elements, evaluates an operator control operation which is performed by means of the operator control device, and reads out a second operator control display, assigned to the operator control operation, from the memory device. In order to improve the ability to perceive the relationship between the first and the second operator control displays, at least one of the display elements from the first operator control display is also contained in the second operator control display (150), the at least one display element in the first operator control display differing from the second operator control display in at least one of its display properties. The computing unit performs a gradual transformation of the at least one display element from the first operator control display to the second operator control display and displays it.

8 Claims, 3 Drawing Sheets

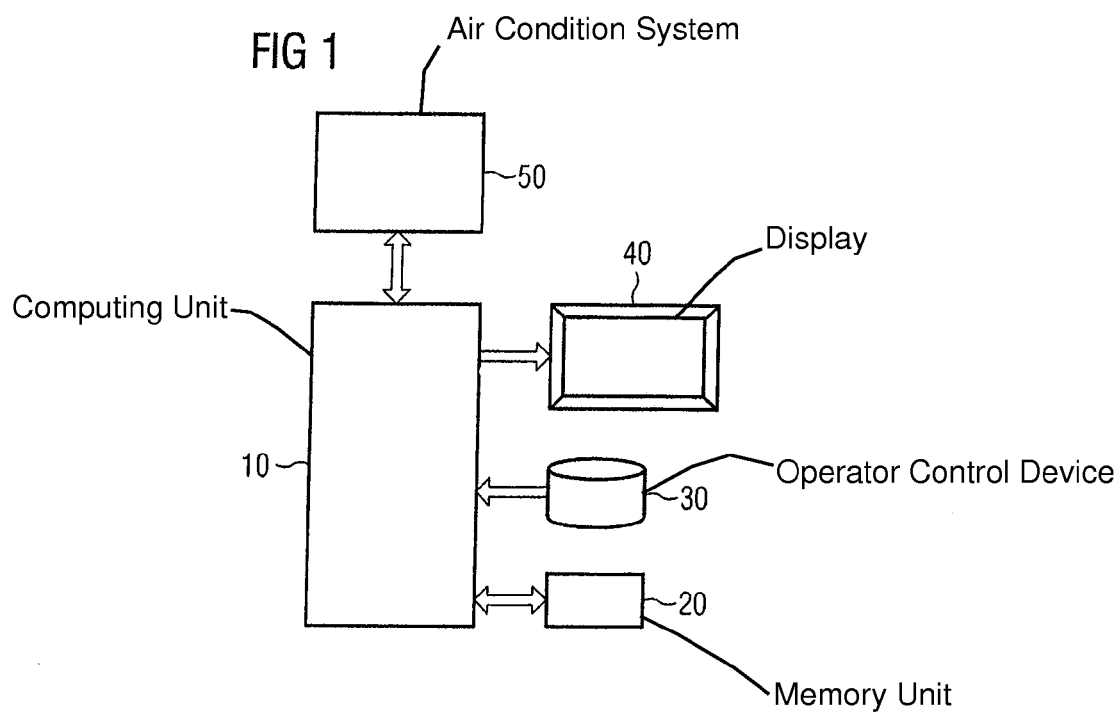
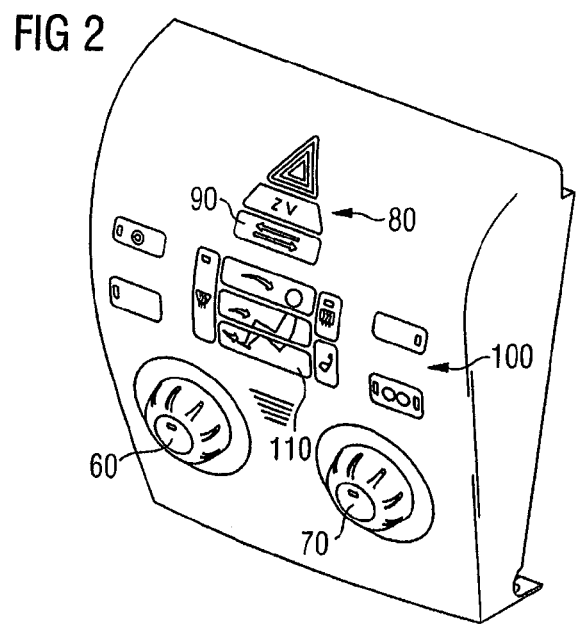

ARRANGEMENT FOR CONTROLLING ELECTRONIC DEVICES, IN PARTICULAR IN A VEHICLE

CLAIM FOR PRIORITY

This application claims the benefit of priority to German Application No. 10 2005 019 871.6, filed in the German language on Apr. 28, 2005, the contents of which are hereby incorporated by reference.

TECHNICAL FIELD OF THE INVENTION

The invention relates to an arrangement for controlling at least one electronic device, in particular in a vehicle.

BACKGROUND OF THE INVENTION

EP 0 940 295 B1 discloses an apparatus for controlling electronic devices in a vehicle, in which apparatus at least two menus which are different from one another can optionally be displayed on a display unit. When the display is switched from the first to the second menu, the display of the first menu is gradually broken up and in an inversely proportional fashion at the same time the display of the second menu is gradually built up in parallel with this so that while the second menu is appearing, parts of the first menu still remain visible. There is thus a complete changeover from one menu image to a second menu image, i.e. after the appearance of the second menu image an operator must redirect his concentration in order to take in its contents. However, in particular when driving vehicles such as motor vehicles and sailing boats or sports craft, the operator only has a short time to take in newly built-up menu images or operator control displays since he has to concentrate mainly on the task of driving.

SUMMARY OF THE INVENTION

The invention relates to an arrangement for controlling at least one electronic device, in particular in a vehicle, having a computing unit which is connected to a memory unit, an operator control device and a display device, the computing unit displaying, on the display device, a first operator control display which is read out from the memory unit and is composed of at least two display elements, evaluating an operator control operation which is performed by means of the operator control device, and reading out a second operator control display, assigned to the operator control operation, from the memory device, and displaying, on the display device, a gradual transition between the first operator control display and the second operator control display.

The present invention specifies an arrangement as described above with a transition between the operator control displays which is improved in terms of the ability to perceive quickly.

According to one embodiment of the invention, at least one of the display elements from the first operator control display is also contained in the second operator control display. In this context, at least one of the display properties of the display element differs between the first operator control display and the second operator control display. The computing unit performs a gradual transformation of the at least one display element from the first operator control display to the second operator control display and displays this transformation.

Retaining at least one display element makes the relationship between the first and second operator control displays more readily apparent to the operator. Since a gradual conversion of individual display properties of the display element or elements present in the two operator control displays is displayed graphically during the transition between the operator control displays, the relationship is even indicated more clearly. Operator control sequences and changes in the display which are associated with changes in the menu are thus self-explanatory so that the operator control procedures can be learnt more quickly. This promotes the acceptance of the arrangement by users.

The following variable display properties are preferably considered: the size of the geometric extent of the at least one display element, its position relative to the display device, and thus within the operator control display, and its orientation and color.

A graphic display of the operator control device or of elements of the operator control device or a symbol for displaying the current operator is preferably used as a display element which is contained in a plurality of operator control displays. A graphic display of the operator control device is understood in particular to be a representation which corresponds to the geometric form of the operator control device and which makes it easier for the operator to perceive the logical relationship between its current actuation and the subsequent changing of the operator control display. The symbol for displaying the current operator is used in turn to indicate whose operator control inputs are currently being received by the computing unit. This is advantageous in operator control devices in which separate operator control elements are no longer available for the driver's side and the front seat passenger's side, as was the case, for example, in earlier air conditioning systems in motor vehicles. In relatively new operator control devices, only one operator control element is respectively made available for setting the venting functions and/or the desired temperature. In order to differentiate between the inputs by the driver and those by the front seat passenger, either an operator recognition device is used, which detects who is currently touching the operator control element by means of different capacitive coupling of the driver's seat and of the front seat passenger's seat for example. Alternatively, a transfer key, which has to be activated to change over between driver inputs and front seat passenger inputs, is available. In both cases, a symbol on the display device indicates the operator to which the current inputs are assigned.

BRIEF DESCRIPTION OF THE DRAWINGS

The invention will be explained in more detail below with reference to an exemplary embodiment and to the drawings, in which:

FIG. 1 shows an arrangement for controlling an air conditioning system in a motor vehicle.

FIG. 2 is an illustration of an operator control device.

DETAILED DESCRIPTION OF THE INVENTION

Figure 3A:
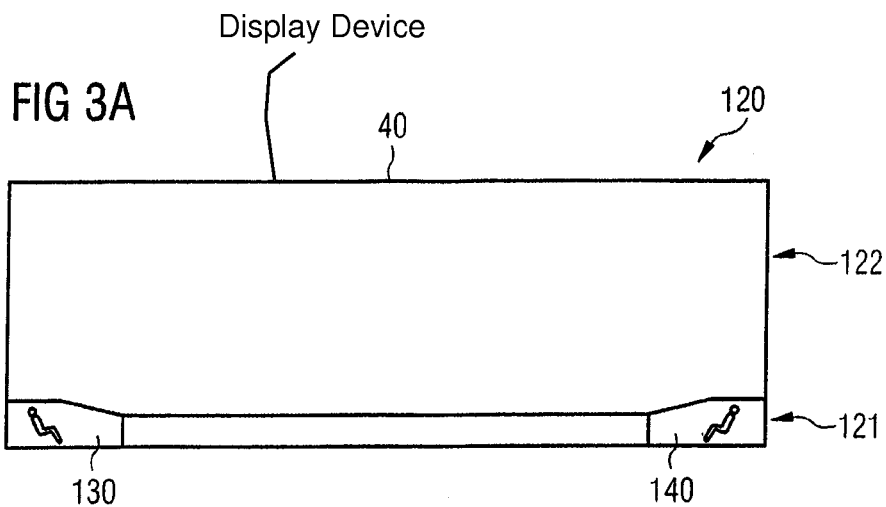
FIGS. 3*a-c* illustrate a transformation of an operator control symbol.

FIG. 1 illustrates an arrangement comprising a computing unit 10, a memory unit 20, an operator control device 30 and a display device 40, which is used to control an air conditioning system 50 in a motor vehicle. The computing unit 10 is connected to all the devices 20, 30, 40 of the arrangement and to the electronic device 50. An operator control menu which is used to control the air conditioning system 50 and contains a plurality of operator control displays is stored in the memory unit 20. The computing unit 10 brings about the output of display elements of, in each case, one of the operator control displays on the display device 40, as can be seen in a simplified form in FIGS. 3 and 4. The collection of operator control elements illustrated in FIG. 2 serves as an operator control device 30. Two turn and press actuators 60 and 70, an upper operator control panel 80 comprising operator control knobs of various sizes and shapes, below which there is also a transfer key 90, and a central operator control panel 100 made up of rectangular operator control knobs. The operator control knobs of the central operator control panel 100 are predominantly used to set ventilation functions and heating functions in the motor vehicle, there being no differentiation between operator control knobs for the driver's side and those for the front seat passenger's side. The differentiation is made solely by means of the transfer key 90, i.e. if the front seat passenger wishes to direct the ventilation onto his feet and the computing unit 10 has last received inputs by the driver, the front seat passenger must first activate the transfer key 90 before he presses the operator control knob 110. In contrast to the operator control knobs of the central operator control panel 100, the turn and press actuators 60 and 70 are assigned unambiguously to the driver's side (60) and to the front seat passenger's side (70) so that the computing unit 10 detects the actuation of the left-hand actuator 60 directly as a driver input and the actuation of the right-hand actuator 70 as a front seat passenger input. The air conditioning system 50 makes air conditioning settings for the associated side of the vehicle in a corresponding way. The driver or the front seat passenger selects a single display element from a plurality of displayed display elements using the turn function of the turn and press actuator 60 and 70, these being, for example, a menu element from a list of menu elements, and he confirms the selection using the press function. If, for example, a menu element with the designation "temperature" has been selected, the desired passenger compartment temperature on the driver's side or on the front seat passenger's side can then be set by means of the turn function of the turn and press actuator 60 or 70 and confirmed as a new predefined value by means of the press function.

Figure 3B:
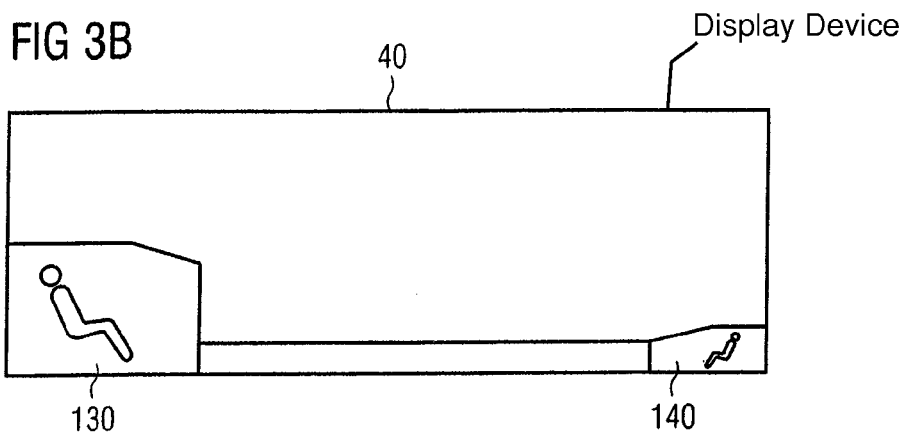
Figure 3C:
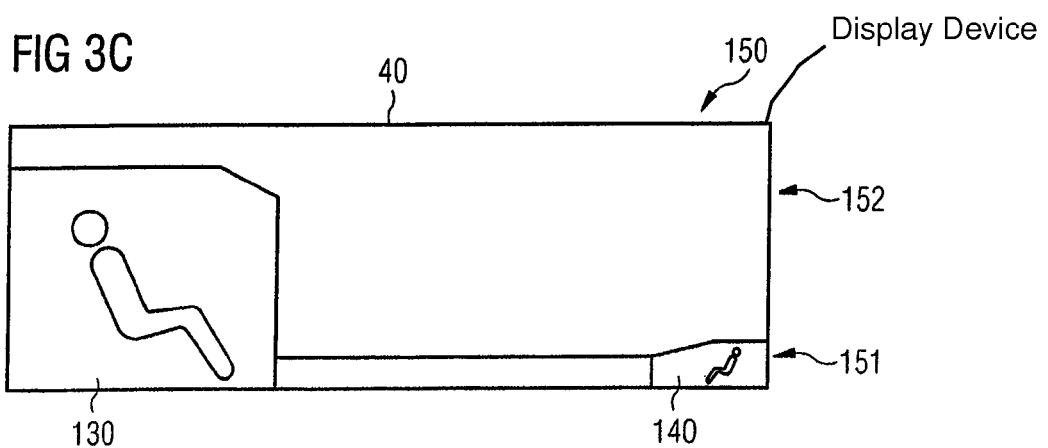

If the driver activates the left-hand turn and press actuator 60 or if it has been predefined by the transfer key 90 that the following activations of operator control knobs of the central operator control panel 100 are to apply to the driver's side and if one of these operator control knobs is subsequently pressed, it is indicated on the display device 40 that the inputs are assigned to the driver's side. FIG. 3*a* shows the initial situation at the lower region 121 of a first operator control display 120 before the activation. A symbol 130, composed of a figure and a closed polygon as an outline, represents the driver and a corresponding symbol 140 represents the front seat passenger. After the actuation, the computing unit 10 detects, by reference to the switched state of the transfer key 90 or by reference to the actuation of the left-hand turn and press actuator 60, that the current operator is the driver. The computer unit 10 correspondingly causes the size of the symbol 130 of the driver to be transformed in order to clarify, in the lower region 151 of a second operator control display 150 shown in FIG. 3*c*, that the following inputs are assigned to the driver's side. As a result, a visual indication of the currently detected operator is provided so that when actuation is carried out by means of the central operator control panel 100, an incorrect assignment can be corrected by pressing on the switch over key again. The size of the symbol 130 is increased gradually, and this is indicated by the intermediate size in FIG. 3*b*, i.e. continuous zooming onto the symbol 130 is shown to the operator until the size from FIG. 3*c* is reached. Depending on the type of actuation, further display elements, such as for example temperature information, ventilation levels or ventilation directions, are introduced into the display, in the upper regions 122 and 152 of the first and second operator control displays.

Figure 4A:
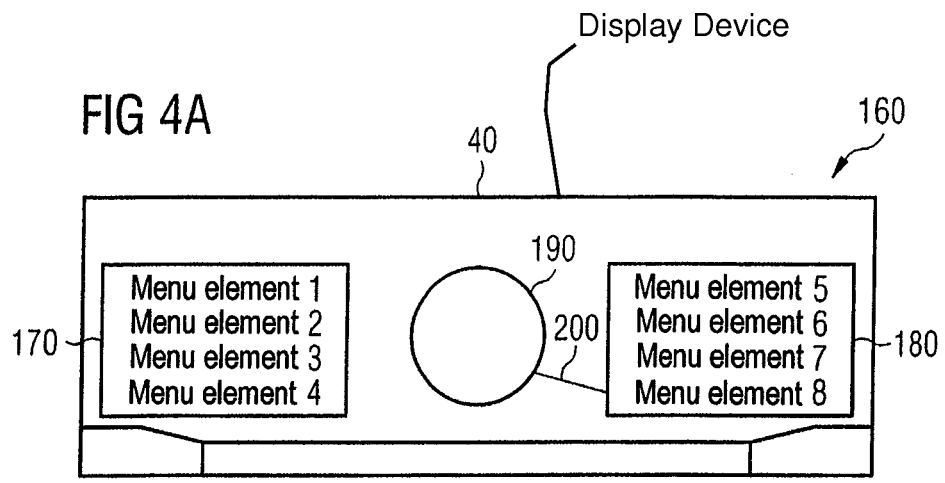
FIGS. 4*a-c* illustrate a transformation of a rotary actuator symbol.
Figure 4B:
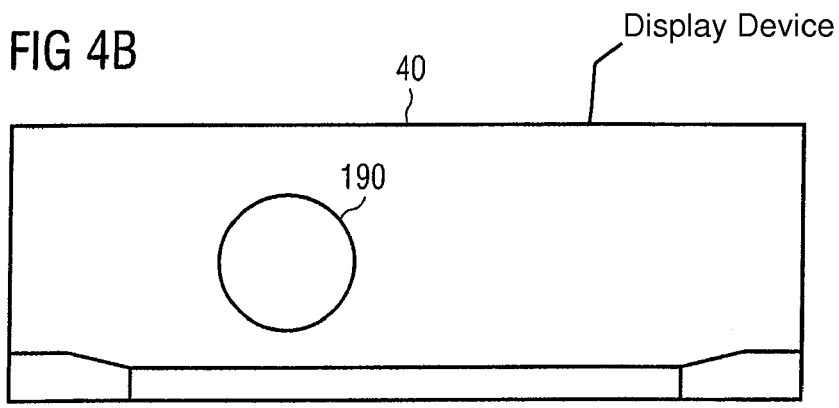
Figure 4C:
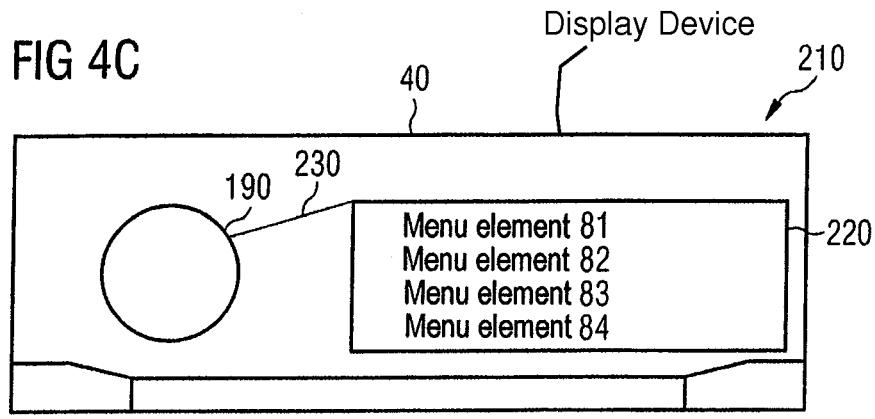

A different type of transformation is shown in FIGS. 4*a* to 4*c*. FIG. 4*a* shows a first operator control display 160 with two rectangular display elements 170 and 180, each of which contains a list of menu elements 1 to 4 and menu elements 5 to 8. The menu elements 1 to 8 themselves are also to be understood as being display elements. The graphic representation of one of the turn and press actuators 60 and 70, this being a circle 190, is inserted as a further display element between the display elements 170 and 180. The circle 190 represents here the geometric shape of the outline of the turn and press actuator 60 or 70. A cursor 200 is used to cause the menu element which is selected by means of the turn function of the turn and press actuator 70 to be made visible, the movement of the cursor along the menu elements 1 to 8 also being displayed as a gradual process. In the case illustrated, menu element 8 is selected. The selection is confirmed by activating the pressing function of the turn and press actuator 70. The computing unit 10 correspondingly reads the submenu assigned to the menu element 8, with the menu elements 81 to 84 (FIG. 4*c*), from the memory unit 20. However, before the submenu is displayed, the computing unit 10 firstly carries out the transformation of the position of the circle 190 and displays this on the display device 40. According to FIG. 4*b*, the display elements 170 and 180 have disappeared during the transformation and the circle 190 is moved continuously to its end position. The end position can be seen in the second operator control display 210 illustrated in FIG. 4*c*. Next to the circle 190, the second operator control display 210 has a rectangular display element 220 in which the list of the menu elements 81 to 84 is displayed, as well as a cursor 230 for indicating the currently selected menu element.

In addition to the air conditioning system 50, any desired number of further electronic devices of the motor vehicle may be connected to the computing unit 10, such as for example a car radio, but also the seat adjustment means and seat heater or the lighting system of the passenger compartment, and these are then also controlled by means of the arrangement comprising the computing unit 10, memory unit 20, operator control device 30 and display device 40.

What is claimed is:

1. A configuration for controlling at least one electronic device, the configuration comprising:
    a memory unit, an operator control device including an actuator, a display device, and a computing unit that is connected to the memory unit, the operator control device, and the display device;
    the computing unit configured to:
        read a first operator control display out from the memory unit, the first operator control display including at least a first display element;
        display the first operator control display on the display device;
        evaluate an operator control operation that is performed with the actuator of the operator control device;
        read out a second operator control display, which is assigned to the operator control operation, from the memory device; the second operator control display including at least the first display element of the first operator control display;

gradually change the display device from displaying the first operator control display to displaying the second operator control display; and gradually transform at least one display property of at least the first display element when changing from the first operator control display to the second operator control display;

wherein the first display element graphically represents a geometric shape of the actuator of the operator control device.

2. The configuration according to claim 1, in combination with the electronic device wherein the electronic device is an electronic device of a vehicle.

3. The configuration according to claim 1, wherein the at least one display property of the first display element includes a size or an extent of the first display element.

4. The configuration according to claim 1, wherein the at least one display property of the first display element includes a position of the first display element on the display device.

5. The configuration according to claim 1, wherein the at least one display property of the first display element includes an orientation of the first display element on the display device.

6. The configuration according to claim 1, wherein the at least one display property includes a perceived color of the first display element such that the color is transformed to a different color when changing from the first operator control display to the second operator control display.

7. The configuration according to claim 1, wherein the operator control device includes a transfer key.

8. The configuration according to claim 1, further comprising an operator recognition device connected to the computing unit.

* * * * *